US010446288B2

(12) United States Patent
Chen et al.

(10) Patent No.: US 10,446,288 B2
(45) Date of Patent: Oct. 15, 2019

(54) RAY BEAM GUIDING DEVICE AND RAY INSPECTION APPARATUS HAVING THE SAME

(71) Applicants: Nuctech Company Limited, Beijing (CN); Nuctech Jiangsu Company Limited, Jiangsu (CN)

(72) Inventors: Zhiqiang Chen, Beijing (CN); Yuanjing Li, Beijing (CN); Ziran Zhao, Beijing (CN); Wanlong Wu, Beijing (CN); Junli Li, Beijing (CN); Ming Ruan, Beijing (CN); Guangwei Ding, Beijing (CN)

(73) Assignees: Nuctech Company Limited, Beijing (CN); Nuctech Jiangsu Company Limited, Jiangsu (CN)

( * ) Notice: Subject to any disclaimer, the term of this patent is extended or adjusted under 35 U.S.C. 154(b) by 0 days.

(21) Appl. No.: 15/578,138

(22) PCT Filed: Jul. 12, 2016

(86) PCT No.: PCT/CN2016/089770
§ 371 (c)(1),
(2) Date: Nov. 29, 2017

(87) PCT Pub. No.: WO2017/076057
PCT Pub. Date: May 11, 2017

(65) Prior Publication Data

US 2018/0308602 A1 Oct. 25, 2018

(30) Foreign Application Priority Data

Nov. 6, 2015 (CN) .......................... 2015 1 0751171

(51) Int. Cl.
*G21K 1/02* (2006.01)
*G01N 23/223* (2006.01)
(Continued)

(52) U.S. Cl.
CPC ................ *G21K 1/025* (2013.01); *G21F 3/00* (2013.01); *H05G 1/02* (2013.01)

(58) Field of Classification Search
CPC ... A61B 6/06; A61B 6/08; G21K 1/02; G21K 1/025; G21K 1/04; G21K 1/10; G21K 1/00
See application file for complete search history.

(56) References Cited

U.S. PATENT DOCUMENTS

2010/0091378 A1 4/2010 Norman et al.
2011/0255662 A1* 10/2011 Shannon, Jr. ........ G01N 23/223 378/44

FOREIGN PATENT DOCUMENTS

CA 660145 A 3/1963
CN 2833569 Y 12/2006
(Continued)

OTHER PUBLICATIONS

"International Search Report and Written Opinion", w/English Translation, (dated Oct. 14, 2016), 13 pgs.
(Continued)

*Primary Examiner* — Don K Wong
(74) *Attorney, Agent, or Firm* — Schwegman Lundberg & Woessner, P.A.

(57) ABSTRACT

The present invention provides a ray beam guiding device for guiding a ray beam in a ray inspection apparatus. The ray beam guiding device is provided in a housing of the ray inspection apparatus, and two ends of the ray beam guiding device are connected to a front collimator and a rear collimator, respectively. The ray beam guiding device comprises a plurality of guiding walls and a guiding cavity surrounded by the guiding walls. The guiding wall is formed of a first material which is capable of absorbing rays or the first material is coated on an inside of the guiding wall, and the guiding cavity has a central axis extending in a direction
(Continued)

from the rear collimator to the front collimator, and the ray beam guiding device further comprises at least one fin plate provided in the guiding cavity of the ray beam guiding device. The at least one fin plate is configured for blocking and/or absorbing scattered rays.

20 Claims, 2 Drawing Sheets

(51) Int. Cl.
*H05G 1/02* (2006.01)
*G21F 3/00* (2006.01)

(56) References Cited

FOREIGN PATENT DOCUMENTS

| | | | |
|---|---|---|---|
| CN | 2847463 | Y | 12/2006 |
| CN | 1936538 | A | 3/2007 |
| CN | 1937100 | A | 3/2007 |
| CN | 1937101 | A | 3/2007 |
| CN | 201725599 | U | 1/2011 |
| CN | 105223211 | A | 1/2016 |
| CN | 105223625 | A | 1/2016 |
| DE | 102011002504 | B3 | 7/2012 |

OTHER PUBLICATIONS

"European Application Serial No. 16861327.1, European Search Report dated Jun. 5, 2019", (dated Jun. 5, 2019), 8 pgs.

* cited by examiner

RAY BEAM GUIDING DEVICE AND RAY INSPECTION APPARATUS HAVING THE SAME

CROSS-REFERENCE TO RELATED APPLICATIONS

This application is a U.S. National Stage Filing under 35 U.S.C. 371 from International Application No. PCT/CN2016/089770, filed on Jul. 12, 2016, and published as WO2017/076057 on May 11, 2017, which application claims the benefit of Chinese Patent Application No. 201510751171.2, filed on Nov. 6, 2015 in the State Intellectual Property Office of China, the disclosures of each of which are incorporated herein by reference in their entirety.

BACKGROUND OF THE INVENTION

Field of the Invention

Embodiments of the present invention relate to a ray beam guiding device and a ray inspection apparatus having the ray beam guiding device.

Description of the Related Art

In existing ray inspection apparatus, an X-ray machine or accelerator is used to generate an X-ray which has a certain emitting solid angle. In order to make the X-ray form a fan-shape ray beam for a scanning inspection, it is often required to take several collimations through slit. In this case, a large amount of scattering rays will be generated in collimators and slit devices, leading to a large loading dose in surroundings. In order to avoid this case from occurring, a ray beam guiding box is usually mounted between a plurality of collimators in the inspection apparatus, so that the scattering rays are trapped and absorbed in the ray beam guiding box, thereby reducing a burden on environmental protection.

Since the scattering rays are in disorder, a homogenized and conservative design is generally employed for the ray beam guiding box in order to enable the scattering rays at weak protection positions such as ends or the like to be blocked and absorbed sufficiently, thereby increasing the weight of the ray beam guiding box and the manufacturing cost, and incurring an inconvenient installation, transportation and the like.

SUMMARY OF THE INVENTION

To this end, in order to address one or more aspects of the above problems, the present disclosure provides an improved ray beam guiding device and a ray inspection apparatus having the ray beam guiding device, in which a fin plate is mounted in a collimator to shield and absorb scattering rays, which is favorable for reducing a thickness of a wall of a ray beam guiding box and reducing an entire weight of the ray beam guiding box.

According to one embodiment of the present invention, there is provided a ray beam guiding device for guiding ray beams in a ray inspection apparatus, the ray beam guiding device being provided in a housing of the ray inspection apparatus, two ends of the ray beam guiding device being connected to a front collimator and a rear collimator respectively, the ray beam guiding device comprising a plurality of guiding walls and a guiding cavity surrounded by the guiding walls, wherein the guiding walls are formed of a first material which is capable of absorbing rays or the first material is coated on an inside of the guiding wall, and the guiding cavity has a central axis extending along a direction from the rear collimator to the front collimator, and wherein the ray beam guiding device further comprises at least one fin plate provided in the guiding cavity of the device, the at least one fin plate being configured for blocking and/or absorbing scattered rays.

In one embodiment, the ray beam guiding device comprises a rear fin portion provided in an end of the rear collimator located in the guiding cavity, the rear fin portion comprising at least one fin plate.

In one embodiment, the ray beam guiding device comprises a front fin portion provided in an end of the front collimator located in the guiding cavity, the front fin portion comprising at least one fin plate.

In one embodiment, the fin plate is sized such that most of the scattered rays through the front collimator and/or the rear collimator are blocked by the fin plate.

In one embodiment, the fin plate is formed of a second material which is capable of absorbing rays or the second material is coated on a side of the fin plate facing towards the central axis of the guiding cavity, for absorbing the scattered rays through the front collimator and/or the rear collimator.

In one embodiment, each fin plate comprises a first portion connected to the front collimator and/or the rear collimator and a second portion extending parallel to the central axis of the guiding cavity.

In one embodiment, the front fin portion and/or the rear fin portion comprise a first fin plate and a second fin plate, respectively, and the first fin plate and the second fin plate are symmetrical with respect to the central axis of the guiding cavity.

In one embodiment, the front fin portion or the rear fin portion consists of one fin plate located in one side of the central axis of the guiding cavity.

In one embodiment, the first material and the second material are the same material.

According to another embodiment of the present invention, there is provided a ray inspection apparatus, comprising: a ray source configured to generate rays; a rear collimator configured to process the rays generated by the ray source into a ray beam with a specific shape; a front collimator configured to divide the ray beam penetrating an object to be inspected into a plurality of ray beams; a detector; a ray beam guiding device according to any one of the above embodiments; wherein the ray beam guiding device is arranged between the front collimator and the rear collimator.

In solutions of the embodiments of the present invention, the design of the interior of the ray beam guiding device is improved by adding a fin plate on the front and/or rear collimators, so that a large portion of scattered rays from the collimator and the slit device are absorbed by the fin plate, and a small portion of the scattered rays which are not absorbed by the fin plate or the ray scattered by the fin plate in turn will either not be easy to leak due to a large incident angle or not be easy to penetrate the ray beam guiding device due to a low energy of the double scattered ray when the ray strikes on the wall of the ray beam guiding device. Thus, the entire wall thickness of the ray beam guiding device may be reduced, the weight thereof may be reduced and cost performance for environmental protection may be increased.

BRIEF DESCRIPTION OF THE DRAWINGS

To make the purpose, technical solutions and advantages of the present invention more clear and apparent, the present invention will be described further in detail in conjunction with the following specific embodiments referring to the accompanying drawings, in which.

DETAILED DESCRIPTION OF PREFERRED EMBODIMENTS OF THE INVENTION

Figure 1:
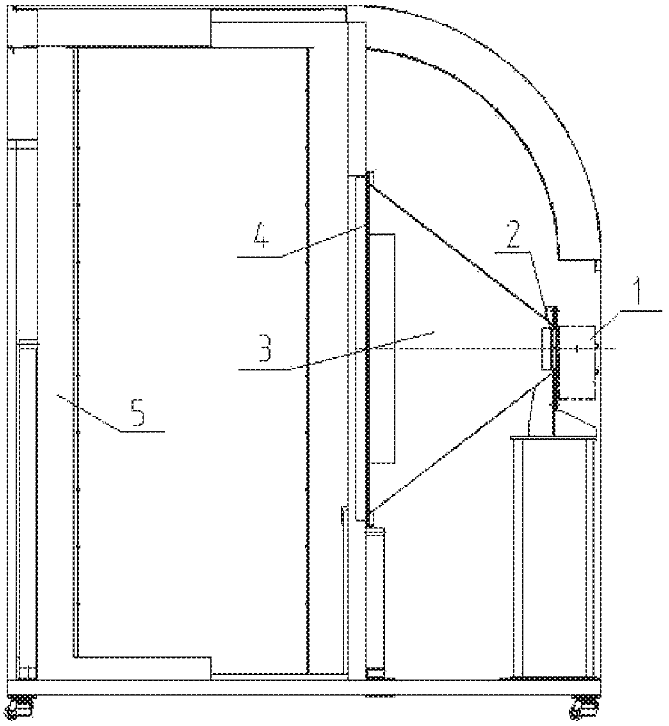
FIG. 1 is a schematic view of a ray inspection apparatus.

Embodiments of the present invention will be described in detail with reference to drawings, the same elements are denoted by like reference numerals throughout the descriptions. The embodiments described herein are explanatory and illustrative and shall not be construed to limit the present invention.

According to a general concept of the present invention, there is provided a ray beam guiding device for guiding a ray beam in a ray inspection apparatus. The ray beam guiding device is provided in a housing of the ray inspection apparatus, and two ends of the ray beam guiding device are connected to a front collimator and a rear collimator, respectively. The ray beam guiding device comprises a plurality of guiding walls and a guiding cavity surrounded by the guiding walls. The guiding wall is formed of a first material which is capable of absorbing rays or the first material is coated on an inside of the guiding wall, and the guiding cavity has a central axis extending in a direction from the rear collimator to the front collimator, and the ray beam guiding device further comprises at least one fin plate provided in the guiding cavity of the ray beam guiding device.

In the following detailed description, for easy of explanation, many specific details are described to provide a throughout understanding of the disclosed embodiments. Obviously, one or more embodiments can be implemented without these specific details. In other circumstances, well-known structures and devices are schematically illustrated for simplifying the drawings.

FIG. 1 is a schematic view of a ray inspection apparatus. As shown in FIG. 1, the ray inspection apparatus comprises a ray source 1, a rear collimator 2, a ray beam guiding device 3, a front collimator 4 and a detector 5. The ray source 1 may include an X-ray source, a gamma ray source, a neutron source or the like. As an example, the ray source 1 in the embodiment is an X-ray machine or an accelerator which emits an X-ray with a certain emitting solid angle and has a target spot 11. The ray, such as X-ray, emitted from the ray source 1, is processed by the rear collimator 2 next to the ray source 1 into a ray beam with a specific shape, such as a fan shape, a conical shape or the like, according to a specific requirement of a user. The ray beam penetrating an object to be inspected is divided by the front collimator 4 into a plurality of thin ray beams. The detector may be an area-array detector or a linear-array detector.

In the illustrated embodiment, the ray beam emitted from the X-ray machine 1 passes through the rear collimator 2 and the front collimator 4 to form a fan-shaped beam which is located in one plane with the linear-array detector 5 behind a channel. Further, a ray beam guiding device 3 is provided between the rear collimator 2 and the front collimator 4, for blocking and absorbing scattered rays from the front and rear collimators and/or a slit device, thereby reducing a radiation protective burden of the housing. In the embodiment, the ray beam guiding device is formed as a form of ray beam guiding box.

Figure 2:
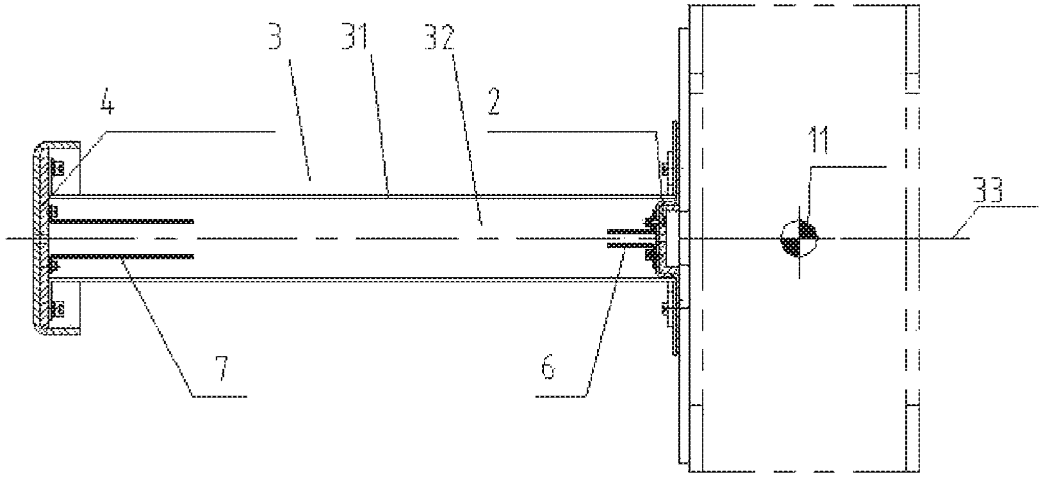
FIG. 2 is a schematic view of a ray beam guiding device according to an embodiment of the present invention.

Further, FIG. 2 is a schematic view of a ray beam guiding device according to an embodiment of the present invention. As shown in FIG. 2, the ray beam guiding device 3 is provided in a housing of the ray inspection apparatus, and two ends of the ray beam guiding device 3 are connected to the front collimator 4 and the rear collimator 2, respectively. The ray beam guiding device 3 comprises a plurality of guiding walls 31 and a guiding cavity 32 surrounded by the guiding walls 31. The guiding wall 31 is formed of a first material which is capable of absorbing rays. In one embodiment, the first material may be coated on an inside of the guiding wall 31, and the first material may be a material with high density, such as Pb. As shown in FIG. 2, the guiding cavity 32 has a central axis 33 extending along a direction from the rear collimator 2 to the front collimator 4, and the central axis 33 may pass through slits of the rear collimator 2 and the front collimator 4, extending in a lateral direction as shown in FIG. 2.

The ray beam guiding device 3 further comprises at least one fin plate provided in the guiding cavity 32 of the device 3. The at least one fin plate is not necessary to be designed to have a large length and thickness, but may be designed so that a large portion of scattered rays from the collimators and the slit device are absorbed by the fin plate, while a small portion of the scattered rays which are not absorbed by the fin plate or rays scattered by the fin plate in turn will either not be easy to leak due to a large incident angle or not be easy to penetrate the ray beam guiding device due to a low power of the double scattered ray when the rays strike on the wall of the ray beam guiding device. In other words, the fin plate is sized so that most of the scattered rays through the front collimator and/or the rear collimator are blocked by the fin plate.

In the embodiment illustrated in FIG. 2, the ray beam guiding device 3 comprises a rear fin portion 6 at the rear collimator 2 and a front fin portion 7 at the front collimator 4.

Figure 3:
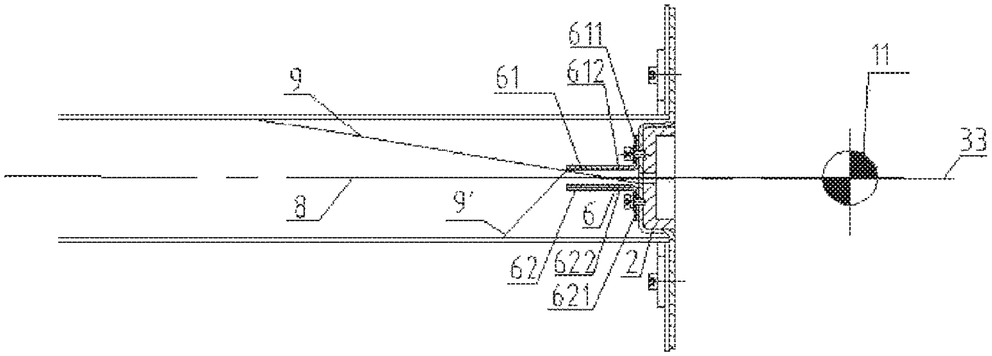
FIG. 3 is an enlarged view showing a fin plate positioned at a rear collimator.
Figure 4:
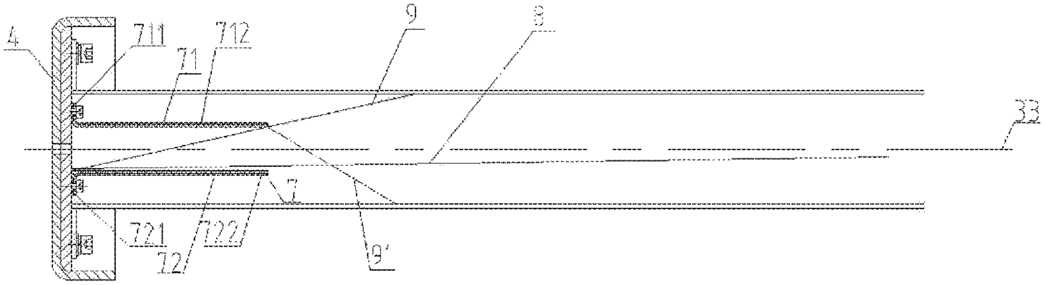
FIG. 4 is an enlarged view showing a fin plate positioned at a front collimator.

FIGS. 3 and 4 are enlarged views showing the rear fin portion 6 and the front fin portion 7, respectively. As shown in FIG. 3, the rear fin portion 6 comprises a first fin plate 61 and a second fin plate 62. The first fin plate 61 comprises a first portion 611 connected to the rear collimator 2 and a second portion 612 extending parallel to the central axis 33 of the guiding cavity. The second fin plate 62 comprises a first portion 621 connected to the rear collimator 2 and a second portion 622 extending parallel to the central axis 33 of the guiding cavity. Specifically, the first portion 611 of the first fin plate 61 and the first portion 621 of the second fin plate 62 are secured onto one end of the rear collimator 2 via screws, respectively.

Similarly, as shown in FIG. 4, the front fin portion 7 comprises a first fin plate 71 and a second fin plate 72. The first fin plate 71 comprises a first portion 711 connected to the front collimator 4 and a second portion 712 extending parallel to the central axis 33 of the guiding cavity. The second fin plate 72 comprises a first portion 721 connected to the front collimator 4 and a second portion 722 extending parallel to the central axis 33 of the guiding cavity. Specifically, the first portion 711 of the first fin plate 71 and the first portion 721 of the second fin plate 72 are secured onto one end of the front collimator 4 via screws, respectively.

The fin plates 61, 71, 62 and 72 each may be sized so that most of the scattered rays through the front collimator 4 and/or the rear collimator 2 are blocked by the respective fin plates. In the illustrated embodiment, the first fin plates 61, 71 and the second fin plates 62, 72 are symmetrical with respect to the central axis 33 of the guiding cavity, respectively. In one embodiment, the dimensions (including length, thickness, etc.) of the fin plates 61, 71, 62, 72 may be different from each other.

Further, the fin plates each may be formed of a second material which is capable of absorbing rays, or the second material is coated on a side of each of the fin plates facing towards the central axis 33 of the guiding cavity, for absorbing the scattered rays through the front collimator 4 and/or the rear collimator 2. For easy of manufacturing, the second material may be the same as the first material. For example, the fin plates each may be formed of a material with high density (such as Pb), or the fin plates each may be formed of stainless steel and then a Pb layer may be coated on the stainless steel plate by means of adhesion or the like.

As shown, scattered rays 9 of an initial ray beam 8 through the slit device of the rear collimator 2 are blocked and/or absorbed by the fin plates 61, 71. Rays 9', which are not blocked or absorbed, or are scattered by the fin plate in turn, have a large incident angle and a low energy when they reach the ray beam guiding box 3, so that the leakage dose is very low after they penetrate the ray beam guiding box 3. Similarly, when the initial ray beam 8 reaches the front collimator 4, most of the initial ray beam is blocked and scattered by the front collimator 4 while a small portion of the initial ray beam radiates through the slit, then most of the scattered rays are blocked and/or absorbed by the fin plates 71, 72. Rays 9', which are not blocked or absorbed, or are scattered by the fin plate in turn, have a large incident angle and a low energy when they reach the ray beam guiding box 3, so that the leakage dose is very low after they penetrate the ray beam guiding box 3. Thus, an effective suppression and absorption to the scattered rays is increased, an entire thickness and a weight of the ray beam guiding box is reduced, and a manufacturing cost as well as installation and transportation difficulty are reduced.

In the illustrated embodiment, the ray beam guiding device comprises two fin portions, i.e. the front fin portion and the rear fin portion, and the front fin portion and the rear fin portion each comprises two fin plates positioned at upper and lower sides of the central axis 33 respectively. However, in another embodiment, the ray beam guiding device may comprise only one fin portion/fin plate at one side of the ray beam guiding device, and the fin portion may also comprise only one fin plate positioned at one side of the central axis 33 of the guiding cavity.

The purpose, technical solutions and advantages of the present invention are further explained in detail from the above specific embodiments. It should be appreciated that the above description is only used as the specific embodiments of the present invention and is not used to limit the present invention. Any modification, substitute and change thereto without departing from the principle and spirit of the present invention shall be included in the scope of present invention.

What is claimed is:

1. A ray beam guiding device for guiding ray beams in a ray inspection apparatus, the ray beam guiding device being provided in a housing of the ray inspection apparatus, two ends of the ray beam guiding device being connected to a front collimator and a rear collimator, respectively, the ray beam guiding device comprising a plurality of guiding walls and a guiding cavity surrounded by the guiding walls, wherein the guiding walls are formed of a first material which is capable of absorbing rays or the first material is coated on an inside of the guiding walls, and the guiding cavity has a central axis extending in a direction from the rear collimator to the front collimator, and wherein the ray beam guiding device further comprises at least one fin plate provided in the guiding cavity of the ray beam guiding device, the at least one fin plate being configured for blocking and/or absorbing scattered rays.

2. The ray beam guiding device according to claim 1, wherein the ray beam guiding device comprises a rear fin portion provided on an end of the rear collimator located in the guiding cavity, the rear fin portion comprising at least one fin plate.

3. The ray beam guiding device according to claim 1, wherein the ray beam guiding device comprises a front fin portion provided on an end of the front collimator located in the guiding cavity, the front fin portion comprising at least one fin plate.

4. The ray beam guiding device according to claim 1, wherein the fin plate is sized such that most of the scattered rays through the front collimator and/or the rear collimator are blocked by the fin plate.

5. The ray beam guiding device according to claim 1, wherein the fin plate is formed of a second material which is capable of absorbing rays or the second material is coated on a side of the fin plate facing towards the central axis of the guiding cavity, for absorbing the scattered rays through the front collimator and/or the rear collimator.

6. The ray beam guiding device according to claim 1, wherein each fin plate comprises a first portion connected to the front collimator and/or the rear collimator and a second portion extending parallel to the central axis of the guiding cavity.

7. The ray beam guiding device according to claim 2, wherein the rear fin portion comprises a first fin plate and a second fin plate, and the first fin plate and the second fin plate are symmetrical with respect to the central axis of the guiding cavity.

8. The ray beam guiding device according to claim 2, wherein the rear fin portion consists of one fin plate located at one side of the central axis of the guiding cavity.

9. The ray beam guiding device according to claim 5, wherein the first material and the second material are the same material.

10. A ray inspection apparatus, comprising:

a ray source configured to generate rays;

a rear collimator configured to process the rays generated by the ray source into a ray beam with a specific shape;

a front collimator configured to divide the ray beam penetrating an object to be inspected into a plurality of ray beams;

a detector;

a ray beam guiding device according to claim 1;

wherein the ray beam guiding device is arranged between the front collimator and the rear collimator.

11. The ray beam guiding device according to claim 2, wherein the ray beam guiding device comprises a front fin portion provided on an end of the front collimator located in the guiding cavity, the front fin portion comprising at least one fin plate.

12. The ray beam guiding device according to claim 2, wherein the fin plate is sized such that most of the scattered rays through the front collimator and/or the rear collimator are blocked by the fin plate.

13. The ray beam guiding device according to claim 3, wherein the fin plate is sized such that most of the scattered rays through the front collimator and/or the rear collimator are blocked by the fin plate.

14. The ray beam guiding device according to claim 2, wherein each fin plate comprises a first portion connected to the front collimator and/or the rear collimator and a second portion extending parallel to the central axis of the guiding cavity.

15. The ray beam guiding device according to claim 3, wherein each fin plate comprises a first portion connected to the front collimator and/or the rear collimator and a second portion extending parallel to the central axis of the guiding cavity.

16. The ray beam guiding device according to claim 4, wherein each fin plate comprises a first portion connected to the front collimator and/or the rear collimator and a second portion extending parallel to the central axis of the guiding cavity.

17. The ray beam guiding device according to claim 5, wherein each fin plate comprises a first portion connected to the front collimator and/or the rear collimator and a second portion extending parallel to the central axis of the guiding cavity.

18. The ray beam guiding device according to claim 3, wherein the front fin portion comprises a first fin plate and a second fin plate, and the first fin plate and the second fin plate are symmetrical with respect to the central axis of the guiding cavity.

19. The ray beam guiding device according to claim 11, wherein the front fin portion and the rear fin portion both comprise a first fin plate and a second fin plate, and the first fin plate and the second fin plate are symmetrical with respect to the central axis of the guiding cavity.

20. The ray beam guiding device according to claim 3, wherein the front fin portion consists of one fin plate located at one side of the central axis of the guiding cavity.

* * * * *